United States Patent [19]

Giesecke et al.

[11] 4,181,789
[45] Jan. 1, 1980

[54] POLYPARABANIC ACID DERIVATIVES AND PROCESS THEREFOR

[75] Inventors: Henning Giesecke, Cologne; Jurgen Hocker, Bergisch Gladbach; Rudolf Merten, Leverkusen, all of Fed. Rep. of Germany

[73] Assignee: Bayer Aktiengesellschaft, Fed. Rep. of Germany

[21] Appl. No.: 944,748

[22] Filed: Sep. 22, 1978

[30] Foreign Application Priority Data

Sep. 28, 1977 [DE] Fed. Rep. of Germany ....... 2743517

[51] Int. Cl.² .................... C08G 18/30; C08G 18/38; C07D 263/04
[52] U.S. Cl. ..................................... 528/73; 528/68; 528/69; 548/147; 548/216
[58] Field of Search ............ 528/68, 73; 260/307 FA, 260/306.7 R

[56] References Cited

U.S. PATENT DOCUMENTS

| 3,661,861 | 5/1972 | Hunsucker | 528/73 |
| 3,960,816 | 6/1976 | Jarisch | 260/23 TN |
| 4,028,312 | 6/1977 | Ball et al. | 528/73 |

FOREIGN PATENT DOCUMENTS

| 342168 | 3/1978 | Austria . | |
| 4534816 | 10/1967 | Japan | 260/306.7 R |

OTHER PUBLICATIONS

Tsuge et al., Tetrahedron, vol. 28, No. 18, pp. 4737–4746 (Sep. 1972).

Primary Examiner—H. S. Cockeram
Attorney, Agent, or Firm—Connolly and Hutz

[57] ABSTRACT

A polyparabanic acid derivative having a recurrent structural unit of the formula

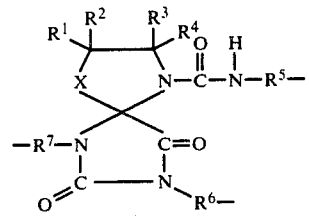

wherein X is O or S; each of $R^1$, $R^2$, $R^3$ and $R^4$, which may be the same or different, when taken separately is hydrogen or an aliphatic, aromatic or aliphatic-aromatic group; $R^1$ and $R^2$ when taken together complete a cycloaliphatic ring and $R^3$ and $R^4$ when taken together complete a cycloaliphatic ring and each of $R^5$, $R^6$ and $R^7$, which may be the same or different, is an aliphatic, aromatic or aliphatic-aromatic residue of an organic isocyanate after removal of at least one isocyanate group and method of producing same by reacting a compound of the formula

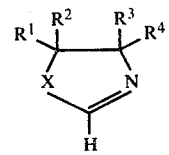

with at least one organic isocyanate having at least two isocyanate groups at a temperature of from $-20°$ to $400°$ C.

9 Claims, No Drawings

POLYPARABANIC ACID DERIVATIVES AND PROCESS THEREFOR

This invention relates to polyparabanic acid derivatives and to processes for the preparation thereof.

The inventive polyparabanic acid derivatives are polymers having the following recurrent structural unit (I) preferably from 2 to 100 times in the polymer chain:

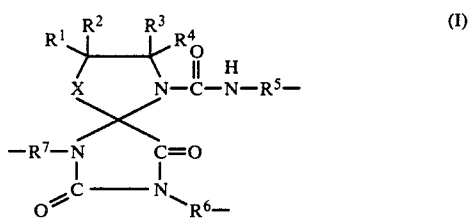

wherein $R^5$, $R^6$ and $R^7$, which may be the same or different, each represents a substituted or unsubstituted aliphatic, aromatic or aliphatic-aromatic group; and $R^1$, $R^2$, $R^3$ and $R^4$, which may be the same or different, each represents hydrogen or a substituted or unsubstituted aliphatic, aromatic or aliphatic-aromatic group; and X represents O or S.

The recurrent units corresponding to above general formula (I) are joined together through the groups $R^5$, $R^6$ and/or $R^7$.

The monovalent, divalent or higher valent radicals $R^5$, $R^6$ and $R^7$ are preferably derived from substituted or unsubstitued $C_2$–$C_{20}$, preferably $C_2$–$C_{12}$, aliphatic radicals such as $C_2$–$C_{12}$ alkyl groups, substituted or unsubstituted $C_6$–$C_{20}$ preferably $C_6$–$C_{16}$, aromatic radicals, such as aryl groups having up to 20 carbon atoms, or diaryl ether groups, radicals derived from $C_1$–$C_{15}$ alkyl esters or $C_6$–$C_{16}$ aryl esters of organic or inorganic acids, or substituted or unsubstituted $C_7$–$C_{20}$, preferably $C_7$–$C_{17}$, aliphatic-aromatic radicals, such as $C_7$–$C_{17}$ aryl alkyl groups, such as xylylene.

$R^1$, $R^2$, $R^3$ and $R^4$ preferably represent hydrogen or are derived from substituted or unsubstituted $C_1$–$C_{20}$, preferably $C_1$–$C_{12}$, aliphatic radicals, such as $C_1$–$C_6$ alkyl groups or $C_5$–$C_7$ cycloalkyl groups, substituted or unsubstituted $C_6$–$C_{20}$, preferably $C_6$–$C_{16}$, aromatic radicals, such as $C_6$–$C_{16}$ aryl groups, such as phenyl, naphthyl, diphenyl or diphenyl ether groups, or substituted or unsubstituted $C_7$–$C_{20}$ aliphatic-aromatic radicals, e.g. $C_7$–$C_{17}$ aryl alkyl groups, such as benzyl. $R^1$ and $R^2$ respectively $R^3$ and $R^4$ may also be joined together to form a cycloaliphatic ring with $C_6$–$C_{10}$.

The following are examples of substituents which may occur on the above-mentioned aliphatic, aliphatic-aromatic or aromatic radicals:

$C_6$–$C_{16}$ aryl (preferably phenyl), alcohol, aldehyde and/or ketone radicals CN, $NO_2$, alkylmercapto and alkoxy radicals (preferably having from 1 to 4 carbon atoms), carboxylic acid ester radicals, phosphonic acid ester radicals, phosphinic acid ester radicals, and sulphonic acid ester radicals, preferably esters of the said acids with lower aliphatic alcohols (preferably having from 1 to 8, more preferably from 1 to 4 carbon atoms), disubstituted amino groups, disubstituted carboxamide radicals and disubstituted sulphonamide radicals, preferably those which are N-substituted by lower aliphatic radicals (preferably having from 1 to 4 carbon atoms), halogens (preferably fluorine, chlorine or bromine) or lower halogenalkyl radicals (preferably having from 1 to 4 carbon atoms, and preferably containing fluorine and/or chlorine), and, in the case of aromatic groups, also lower alkyl radicals preferably those having from 1 to 4 carbon atoms.

The polyparabanic acid derivatives according to the present invention preferably have molecular weights of from 1000 to 50,000, in particular from 4000 to 30,000 (determined by the osmotic method). They show characteristic IR-absorptions at 1720–1740 cm$^{-1}$ (strong) and 1775–1800 cm$^{-1}$ (weak), in addition to urea carbonyl bands at 1630–1700 cm$^{-1}$ (strong).

The polyparabanic acid derivatives according to the present invention may be prepared by the reaction of 2-oxazolines respectively 2-thiazolines corresponding to the following general formula (II):

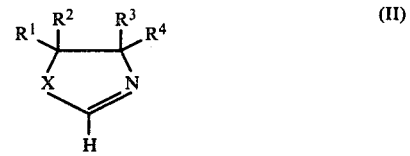

wherein $R^1$ to $R^4$ and X are as defined above; with organic isocyanates.

The following 2-oxazolines are particularly suitable for carrying out the process:
2-oxazoline, 5-methyl-2-oxazoline, 4,4-dimethyl-2-oxazoline, 4-ethyl-2-oxazoline, 5-hydroxymethyl-2-oxazoline, 5-benzyl-2-oxazoline, 4-phenyl-2-oxazoline and hexahydrobenzoxazole; also the following 2-thiazolines:
2-thiazoline, 5-methyl-2-thiazoline, 4,4-dimethyl-2-thiazoline, 4-ethyl-2-thiazoline, 5-benzyl-2-thiazoline, 4-phenyl-2-thiazoline and hexahydrobenzothiazole.

The organic polyisocyanates used as starting components according to the present invention are preferably $C_2$–$C_{20}$ aliphatic, $C_5$–$C_{12}$ cycloaliphatic, $C_7$–$C_{20}$ araliphatic, $C_6$–$C_{20}$ aromatic and $C_4$–$C_{20}$ heterocyclic polyisocyanates, such as those described, e.g. by W. Siefken in Justus Liebigs Annalen der Chemie, 562, pages 75 to 136. The following are specific examples:
ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane (German Auslegeschrift No. 1,202,785); 2,4- and 2,6-hexahydrotolylene diisocyanate and mixtures of these isomers; hexahydro-1,3- and/or -1,4-phenylene diisocyanate; perhydro-2,4'-and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; naphthylene-1,5-diisocyanate; triphenyl methane-4,4',4"-triisocyanate; polyphenyl-polymethylene polyisocyanates, such as those which may be obtained by the condensation of aniline and formaldehyde, followed by phosgenation and which have been described, e.g. in British Pat. Nos. 874,430 and 848,671; perchlorinated aryl polyisocyanates as described, e.g. in German Auslegeschrift No. 1,157,601; polyisocyanates containing carbodiimide groups as described in German Pat. No. 1,092,007; the diisocyanates described in U.S. Pat. No. 3,492,330; polyisocyanates containing allophanate groups as described, e.g. in British Pat. No.

994,890, Belgian Pat. No. 761,626 and published Dutch Pat. application No. 7,102,524; polyisocyanates containing isocyanurate groups as described, e.g. in German Patent Nos. 1,022,789; 1,222,067 and 1,027,394 and in German Offenlegungsschrift Nos. 1,929,034 and 2,004,048; polyisocyanates containing urethane groups as described, e.g. in Belgian Pat. No. 752,261 or in U.S. Pat. No. 3,394,164; polyisocyanates containing acylated urea groups according to German Pat. No. 1,230,778; polyisocyanates containing biuret groups as described, e.g. in German Pat. No. 1,101,394, British Pat. No. 889,050 and French Pat. No. 7,017,514, polyisocyanates prepared by telomerisation reactions as described, e.g. in Belgian Pat. No. 723,640, polyisocyanates containing ester groups as described, e.g. in British Patent Nos. 956,474 and 1,072,956, U.S. Pat. No. 3,567,763 and German Pat. No. 1,231,688, and reaction products of the aforesaid isocyanate with acetals according to German Pat. No. 1,072,385.

The distillation residues still containing isocyanate groups from the commercial production of isocyanates may also be used, optionally dissolved in one or more of the above-mentioned polyisocyanates. Mixtures of the above-mentioned polyisocyanates may also be used.

It is preferred to use isocyanates, preferably polyisocyanates, corresponding to the following general formula (III):

$$R_5(NCO)_n \qquad (III)$$

wherein $R_5$ is as defined above; and n represents an integer of from 1 to 4, preferably 1 or 2, more preferably 2. The groups $R_6$ and $R_7$ in above general formula (I) correspond to $R_5$ and are also derived from isocyanates corresponding to general formula (III).

It is generally preferred to use technically readily available polyisocyanates, such as 2,4- and 2,6-tolylene diisocyanate and mixtures of these isomers ("TDI"), polyphenyl-polymethylene polyisocyanates, such as can be prepared by aniline/formaldehyde condensation, followed by phosgenation ("crude MDI") and polyisocyanates containing carbodiimide groups, urethane groups, allophanate groups, isocyanurate groups, urea groups or biruet groups, ("modified polyisocyanates").

Monoisocyanates corresponding to the general formula (III) may be used in addition to polyisocyanates in order to reduce the degree of cross-linking of the polyparabanic acid derivatives.

The process is generally carried out by reacting the starting components in an organic solvent at temperatures of from $-20°$ to $+400°$ C. The polymer formed either remains in solution or precipitates. It may be isolated by removal of the solvent by distillation. The quantities of starting compounds may be chosen to provide from 0.5 to 10 mol, preferably at least 3 mol, of isocyanate groups per mol of 2-oxazoline or 2-thiazoline. Solvents suitable for the process are compounds which are inert towards isocyanate groups, e.g. aromatic hydrocarbons, chlorinated aromatic hydrocarbons, benzonitrile, aliphatic hydrocarbons, esters and ketones. Toluene, xylene, mesitylene, chlorobenzene, dichlorobenzene, N-methyl pyrrolidone, dimethyl formamide, dimethyl acetamide, hexamethyl phosphoric acid triamide, tetramethyl urea, nitromethane and nitrobenzene are particularly suitable. However, the components may also be reacted in the absence of solvents.

The reaction times are generally from 15 minutes to 100 hours, preferably from 30 minutes to 20 hours, but may lie above or below these limits in certain cases.

The reaction temperatures employed are from $-20°$ to $+400°$ C., depending on the starting material, but temperatures of from 20° to 350° C., especially from 20° to 250° C., are preferred.

Polymerisation may be carried out with the aid of the conventional acidic or basic catalysts used in isocyanate chemistry, e.g. metal alcoholates or tertiary amines.

The polyparabanic acid derivatives obtained in this way may carry isocyanate end groups so that they may be cross-linked with the conventional compounds of isocyanate chemistry, such as polyols or polyamides, or they may be cross-linked to form isocyanurate structures. Chain-lengthening with the formation of carbodiimide or uretdione structures is also possible.

Other polymers, such as polyesters, polyethers, polyamides, polyurethanes, polyolefins, polyacetals, polyepoxides, polyimides, polyamidines, polyimide diisocyanates and polyhydantoins may also be used in known manner in the process according to the present invention. These materials may be added to the finished polymers according to the present invention or they may be polymerised with them.

According to the particular embodiment of the process, hydroxyl group-containing polyesters or polyethers are added with excess quantities of isocyanate components to produce a combination of parabanic acid- and urethane-polymer. For this purpose there may be used, for example, mixtures of polyhydroxyl compounds, polyisocyanate (derivative) and a compound corresponding to above general formula (II), and these mixtures are reacted together in a final stage of the process to be converted into the synthetic material, optionally after precondensation of two of the components of the mixture.

The known types of hydroxyl polyesters may be used, which may be obtained by the conventional methods from polycarboxylic acids, e.g. succinic, adipic, sebacic, phthalic, isophthalic, terephthalic or oleic acid, and polyhydric alcohols, e.g. glycol, diethylene glycol, triethylene glycol, propylene glycol, dipropylene glycol, glycerol, trimethylol propane or pentaerythritol.

The polyparabanic acid derivatives according to the present invention and mixtures thereof are temperature-resistant synthetic materials which have excellent mechanical properties and may be used for example as lacquers or foils. They may contain the conventional additives for synthetic materials, such as fillers, pigments, anti-oxidants and plasticisers.

EXAMPLE 1

3.6 parts, by weight, of 2-oxazoline are added dropwise to 16.7 parts, by weight, of isophorone diisocyanate over a period of 15 minutes at 100° C. The mixture is then stirred for two hours at 150° C. 18.3 parts, by weight, of a colourless polymer are obtained. Viscosity of a 30% solution in o-dichlorobenzene at 25° C: 14,140 cP. I.R. in dichlorobenzene: 1786 cm$^{-1}$, 1728 cm$^{-1}$, 1679 cm$^{-1}$ (C=O)

EXAMPLE 2

4 parts, by weight, of 5-methyl-2-oxazoline are added dropwise over a period of 10 minutes to 26.1 parts, by weight, of an isomer mixture of 80 parts by weight of 2,4-tolylene diisocyanate and 20 parts, by weight, of 2,6-tolylene diisocyanate at 100° C. 34 parts, by weight, of cresol and 4.5 parts, by weight, of 5-methyl-2-oxazoline are then added and the solution is stirred for 2 hours at 175° C. 68 parts, by weight, of a 50% by weight solution of a polymer in cresol is obtained. Viscosity of a 30% by weight solution in cresol at 25° C.: 19,400 cP.

EXAMPLE 3

100.8 parts, by weight, of hexamethylene diisocyanate and 9.9 parts, by weight, of 4,4-dimethyl-2-oxazoline are stirred for one hour at 100° C. and then for one hour at 150° C. After concentration of the solution by evaporation in a high vacuum at 160° C., 43.0 parts, by weight, of a prepolymer having an isocyanate content at 21.2% are obtained.

30 parts, by weight, of the prepolymer are mixed with 40 parts, by weight, of a 65% by weight solution in ethyl glycol acetate of a polyester which has been prepared from 52 parts, by weight, of phthalic acid anhydride, 0.6 parts, by weight, of maleic acid anhydride and 54 parts, by weight, of trimethylol propane and contains 5.2% of hydroxyl groups, and with 0.1 parts, by weight, of Sn (II)-dioctoate. A quick drying lacquer is obtained.

EXAMPLE 4

1 part, by weight, of 4,4-dimethyl-2-oxazoline and 1 part, by weight, of hexamethylene diisocyanate are stirred together at room temperature. The mixture is painted on an Erichsen Plate measuring 180×70×0.2 mm and stoved at 200° C. for 10 minutes. A firmly adhereing lacquer having a softening temperature of from 215° to 250° C. is obtained.

EXAMPLE 5

5.0 parts, by weight, of 4,4-dimethyl-2-oxazoline are added dropwise over a period of 1 hour to 18.8 parts, by weight, of diphenyl methane-diisocyanate-(4,4') in 20 parts, by weight, of toluene at 25° C. The mixture is then stirred under reflux for 1 hour. 17.6 parts, by weight, of a solid polymer having the characteristic I.R. absorption bands for parabanic acid derivatives at 1793 cm$^{-1}$ (weak) and 1739 cm$^{-1}$ (strong) are obtained after filtration.

EXAMPLE 6

8.7 parts, by weight, of 2-thiazoline are added dropwise to 37.5 parts, by weight, of diphenyl methanediisocyanate-(4,4') in 50 parts, by weight, of toluene at 80° C. over a period of 30 minutes. The mixture is then stirred for 2 hours at 110° C. 45.5 parts, by weight, of a solid polymer having I.R. absorption bands at 1788 cm$^{-1}$ (weak), 1729 cm$^{-1}$ (strong) and 1674 cm$^{-1}$ (strong) are obtained after filtration.

EXAMPLE 7

26.1 parts, by weight, of 2,4-tolylene diisocyanate are added dropwise to 9.7 parts, by weight, of 4,4-dimethyl-2-oxazoline in 40 parts, by weight, of toluene at 100° C. within 30 minutes. The mixture is then stirred at 110° C. for 9 hours. 31.8 parts, by weight, of a solid polymer which has the characteristic I.R. absorption bands for parabanic acid derivatives at 1793 cm$^{-1}$ (weak) and 1719 cm$^{-1}$ (strong) are obtained after filtration. Viscosity of a 20% by weight solution in cresol at 25° C.: 13,200 cP.

I claim:

1. A polyparabanic acid derivative having a recurrent structural unit of the formula

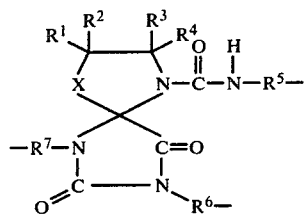

wherein X is O or S; each of $R^1$, $R^2$, $R^3$ and $R^4$, which may be the same or different, when taken separately in hydrogen or an aliphatic, aromatic or aliphatic-aromatic group; $R^1$ and $R^2$ when taken together complete a cycloalihatic ring and $R^3$ and $R^4$ when taken together complete a cycloaliphatic ring and each of $R^5$, $R^6$ and $R^7$, which may be the same or different, is an aliphatic, aromatic or aliphatic-aromatic residue or an organic isocyanate after removal of at least one isocyanate group.

2. A polyparabanic acid derivative as claimed in claim 1 wherein $R^1$, $R^2$, $R^3$ and $R^4$, which may be the same or different, each represents hydrogen or an optionally substituted $C_1$–$C_{20}$ aliphatic radical, $C_5$–$C_7$ cycloaliphatic radical, $C_6$–$C_{20}$ aromatic radical or $C_7$–$C_{20}$ aliphatic-aromatic radical or, taken in pairs, may complete a $C_6$–$C_{10}$ cycloaliphatic ring; $R^5$, $R^6$ and $R^7$, which may be the same or different, each represents an optionally substituted $C_2$–$C_{20}$ aliphatic radical, $C_6$–$C_{20}$ aromatic radical or $C_7$–$C_{20}$ aliphatic-aromatic radical.

3. A polyparabanic acid derivative as claimed in claim 1 comprising from 2 to 100 structural units (I).

4. A polyparabanic acid derivative as claimed in claim 1 having a molecular weight of from 1000 to 50,000.

5. A polyparabanic acid derivative as claimed in claim 4 having a molecular weight of from 4000 to 30,000.

6. A process for preparing a polyparabanic acid derivative as claimed in claim 12 wherein a compound of the formula

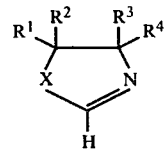

wherein X is O or S and each of $R^1$, $R^2$, $R^3$ and $R^4$, which may be the same or different, when taken separately is hydrogen or an aliphatic, aromatic or aliphatic-aromatic group; $R^1$ and $R^2$ when taken together complete a cycloaliphatic ring and $R^3$ and $R^4$ when taken together complete a cycloaliphatic ring is reacted with at least one organic isocyanate having at least two isocyanate groups at a temperature of from $-20°$ to 400° C.

7. A process as claimed in claim 6 wherein the temperature is from 20° to 250° C.

8. A polyparabanic acid derivative when prepared by a process as claimed in claim 6.

9. Lacquers containing a polyparabanic acid derivative as claimed in claim 1.